(12) United States Patent
Park et al.

(10) Patent No.: US 8,396,708 B2
(45) Date of Patent: Mar. 12, 2013

(54) FACIAL EXPRESSION REPRESENTATION APPARATUS

(75) Inventors: Chi-youn Park, Busan-si (KR); Young-kyoo Hwang, Seoul (KR); Jung-bae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 12/695,185

(22) Filed: Jan. 28, 2010

(65) Prior Publication Data
US 2010/0211397 A1  Aug. 19, 2010

(30) Foreign Application Priority Data
Feb. 18, 2009  (KR) .......................... 10-2009-0013530

(51) Int. Cl.
*G10L 15/00* (2006.01)
*G10L 13/00* (2006.01)
*G10L 11/00* (2006.01)
(52) U.S. Cl. ..................... 704/231; 704/258; 704/270
(58) Field of Classification Search .............. 704/231, 704/258, 270
See application file for complete search history.

(56) References Cited

U.S. PATENT DOCUMENTS

| | | | | |
|---|---|---|---|---|
| 5,657,426 A * | 8/1997 | Waters et al. | | 704/276 |
| 5,734,923 A * | 3/1998 | Sagawa et al. | | 715/204 |
| 5,887,069 A * | 3/1999 | Sakou et al. | | 382/100 |
| 6,232,965 B1 * | 5/2001 | Scott et al. | | 715/203 |
| 6,504,944 B2 * | 1/2003 | Mihara et al. | | 382/118 |
| 6,675,145 B1 | 1/2004 | Yehia et al. | | |
| 6,735,566 B1 * | 5/2004 | Brand | | 704/256 |
| 6,885,761 B2 * | 4/2005 | Kage | | 382/118 |
| 6,909,453 B2 * | 6/2005 | Mochizuki et al. | | 348/14.1 |
| 7,340,393 B2 * | 3/2008 | Mitsuyoshi | | 704/207 |
| 7,822,611 B2 * | 10/2010 | Bezar | | 704/273 |
| 2002/0070945 A1 * | 6/2002 | Kage | | 345/581 |
| 2003/0081834 A1 * | 5/2003 | Philomin et al. | | 382/190 |
| 2003/0126013 A1 * | 7/2003 | Shand | | 705/14 |
| 2003/0182123 A1 * | 9/2003 | Mitsuyoshi | | 704/270 |
| 2004/0093218 A1 * | 5/2004 | Bezar | | 704/273 |
| 2005/0159958 A1 * | 7/2005 | Yoshimura | | 704/276 |

(Continued)

FOREIGN PATENT DOCUMENTS

| | | |
|---|---|---|
| JP | 10-228295 | 8/1998 |
| JP | 2001-126077 | 11/2001 |
| JP | 2006-065683 | 3/2006 |
| KR | 1020010025161 | 4/2001 |

OTHER PUBLICATIONS

D. Bitouk, S. K. Nayar; Creating a Speech Enabled Avatar from a Single Photograph; Proceedings of IEEE Virtual Reality; Mar. 2008.*

(Continued)

*Primary Examiner* — Jesse Pullias
(74) *Attorney, Agent, or Firm* — NSIP Law

(57) ABSTRACT

An avatar facial expression representation technology is provided. The avatar facial expression representation technology estimates changes in emotion and emphasis in a user's voice from vocal information, and changes in mouth shape of the user from pronunciation information of the voice. The avatar facial expression technology tracks a user's facial movements and changes in facial expression from image information and may represent avatar facial expressions based on the result of the these operations. Accordingly, the avatar facial expressions can be obtained which are similar to actual facial expressions of the user.

19 Claims, 9 Drawing Sheets

U.S. PATENT DOCUMENTS

| | | | |
|---|---|---|---|
| 2007/0050716 A1* | 3/2007 | Leahy et al. | 715/706 |
| 2007/0074114 A1* | 3/2007 | Adjali et al. | 715/706 |
| 2008/0001951 A1* | 1/2008 | Marks et al. | 345/474 |
| 2008/0068397 A1* | 3/2008 | Carey et al. | 345/619 |
| 2008/0096533 A1* | 4/2008 | Manfredi et al. | 455/412.1 |
| 2008/0201144 A1* | 8/2008 | Song et al. | 704/236 |
| 2008/0201282 A1* | 8/2008 | Garcia et al. | 706/20 |
| 2009/0285456 A1* | 11/2009 | Moon et al. | 382/118 |
| 2010/0086204 A1* | 4/2010 | Lessing | 382/165 |
| 2010/0266213 A1* | 10/2010 | Hill | 382/218 |
| 2011/0066436 A1* | 3/2011 | Bezar | 704/251 |
| 2011/0115798 A1* | 5/2011 | Nayar et al. | 345/473 |

OTHER PUBLICATIONS

Oliver Jokisch, Uwe Koloska, Diane Hirschfeld, and Rüdiger Hoffmann. 2005. Pronunciation learning and foreign accent reduction by an audiovisual feedback system. In Proceedings of the First international conference on Affective Computing and Intelligent Interaction (ACII'05), Jianhua Tao, Tieniu Tan, and Rosalind W. Picard (Eds.). Springer-Verlag.*

* cited by examiner

FIG.5

| ARTICULATION GROUP | HORIZONTAL | VERTICAL |
|---|---|---|
| LOW VOWEL | 1 | 1 |
| MID VOWEL | 1.2 | 0.8 |
| HIGH VOWEL | 1.2 | 0.2 |
| ROUNDED VOWEL | 0.5 | 0.3 |
| VELAR CONSONANT | -- | -- |
| ALVEOLAR CONSONANT | -- | 0.3 |
| LABIAL CONSONANT | -- | 0 |

("--" MAINTAIN PREVIOUS MOUTH SHAPE)

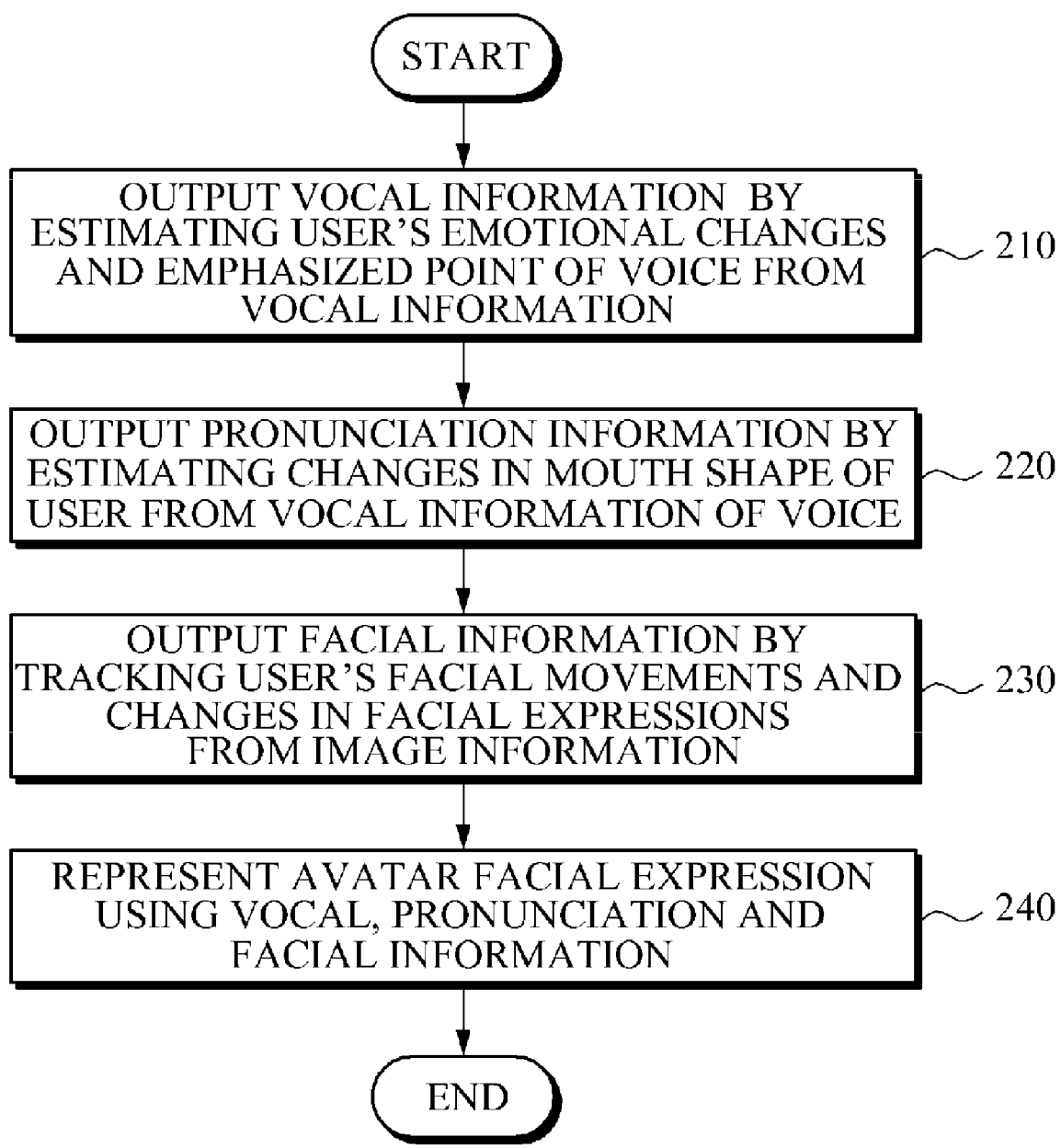

FACIAL EXPRESSION REPRESENTATION APPARATUS

CROSS REFERENCE TO RELATED APPLICATION

This application claims the benefit under 35 U.S.C. §119(a) of a Korean Patent Application No. 10-2009-0013530, filed on Feb. 18, 2009, in the Korean Intellectual Property Office, the entire disclosure of which is incorporated herein by reference for all purposes.

BACKGROUND

1. Field

The following description relates to an avatar facial expression representation technology that represents facial expressions of an avatar based on an image and voice data inputted from a user through a camera and a microphone.

2. Description of the Related Art

Various studies on the control of an avatar in a virtual space have been carried out. Recently there has been a development of a technology that represents various facial expressions by controlling facial movements of an avatar.

In an electronic communication system, a user's intention may be more efficiently conveyed by controlling facial expressions and movements of lips of an avatar, compared to controlling body movements. Therefore, a research on a technology to represent more natural and sophisticated avatar facial expressions has been conducted.

SUMMARY

In one general aspect, there is provided an avatar facial expression representation apparatus, comprising a vocal information processing unit to output vocal information including at least one of an emotional change of a user and a point of emphasis of the user from vocal information generated by a user's voice, a pronunciation information processing unit to output pronunciation information including a change in mouth shape of the user from pronunciation information generated by the user's voice, an image information processing unit to output facial information by tracking facial movements and changes in facial expression of the user from image information, and a facial expression processing unit to represent a facial expression of an to avatar using at least one of the vocal information output from the vocal information processing unit, the pronunciation information output from the pronunciation information processing unit, and the facial information output from the image information processing unit.

The vocal information processing unit may comprise a parameter extracting portion to extract a parameter related to a change in emotion from the vocal information of the voice, an emotion change estimating portion to estimate a change in emotion by monitoring a long-term change of the parameter extracted by the parameter extracting portion, a point of emphasis estimating portion to estimate a point of emphasis by monitoring a short-term change of the parameter extracted by the parameter extracting portion, and a vocal information output portion to create the vocal information based on the change in emotion estimated by the emotion change estimating portion and the point of emphasis estimated by the point of emphasis estimating portion, and to output the created vocal information.

The parameter related to a change in emotion may include an intensity of a voice signal, a pitch of a voice sound, and voice quality information.

The long-term change of the parameter may be identified by detecting a change of the parameter or a changing speed of the parameter during a predetermined first reference time.

The short-term change of the parameter may be identified by detecting a change of the parameter or a changing speed of the parameter during a predetermined second reference time which is set shorter than the predetermined first reference time.

The point of emphasis estimating portion may estimate a point of emphasis as a vocal point where a sound is changed.

The pronunciation information processing unit may comprises a parameter extracting portion to extract a parameter related to a change in mouth shape from the pronunciation information generated by the user's voice, a mouth shape estimating unit to estimate a change in mouth shape of the user based on the parameter extracted by the parameter extracting unit, and a pronunciation information output portion to create the pronunciation information based on the change in mouth shape estimated by the mouth shape estimating portion, and to output the created pronunciation information.

The parameters related to the change in mouth shape may include information about at least one of how far the upper and lower lips are apart, how wide the lips are open, and how far the lips are pushed forward.

The mouth shape estimating portion may search a database for an articulation group to which a sound of the user's voice belongs to, extract a parameter corresponding to a found articulation group, and estimate the change in mouth shape of the user based on the extracted parameter, wherein the database stores articulation groups into groups that include phonemes similar in lip shape.

The image information processing unit may comprise an image data analyzing portion to extract a location of a feature point that represents a facial expression of the user from the image information, a facial expression change portion to track facial movements and the changes in facial expression of the user based on the location of a feature point extracted by the image information analyzing portion, and a facial information output portion to create the facial information based on the facial movements and changes in facial expressions of the user tracked by the facial expression change tracking portion and to output the created facial information.

The facial expression processing unit may comprise a facial expression representing portion to represent a general facial expression of an avatar according to changes in emotion included in the vocal information output from the vocal information processing unit, a first correcting portion to correct the facial expression of the avatar according to the change in mouth shape of the user included in the pronunciation information output from the pronunciation information processing unit, a second correcting portion to correct the facial expression of the avatar according to the point of emphasis included in the vocal information output from the vocal information processing unit, and a third correcting portion to correct the facial expression of the avatar according to the facial movements and changes in facial expression of the user included in the facial information output from the image information processing unit.

The avatar facial expression representation apparatus may further comprise a reliability evaluating unit to evaluate a reliability of at least one of the vocal information output from the vocal information processing unit, a reliability of the pronunciation information output from the pronunciation information processing unit, and a reliability of the facial information output from the image information processing unit.

The facial expression processing unit may discard, when representing the facial expression of the avatar, information which is determined by the reliability evaluating unit to have a lower reliability.

The reliability evaluating unit may evaluate the reliability of the vocal information based on correlation between a facial expression due to the change in emotion included in the vocal information and a facial expression according to an emotion model.

The reliability evaluating unit may evaluate the reliability of the pronunciation information based on a length of silence or the quantity of noise included in a voice sound.

The reliability evaluating unit may evaluate the reliability of the facial information based on locations of feature points that represent the facial expression of the user and changes in facial expression.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 5 is a table illustrating exemplary articulation groups.

FIG. 9 is a flowchart illustrating an exemplary method of controlling avatar facial expressions.

Figure 1:
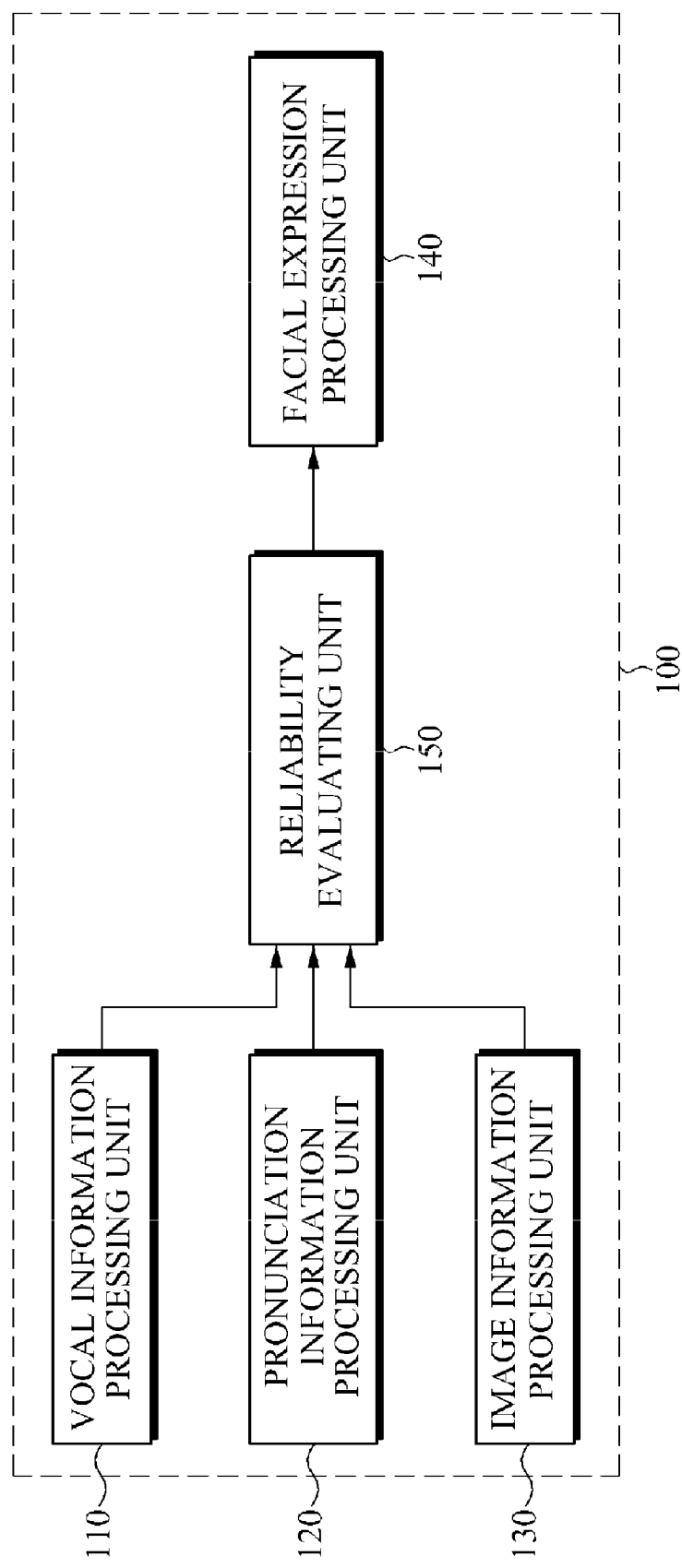
FIG. 1 is a diagram illustrating an exemplary avatar facial expression representation apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a to comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary avatar facial expression representation apparatus 100. As illustrated in FIG. 1, the avatar facial expression representation apparatus 100 includes a vocal information processing unit 110, a pronunciation information processing unit 120, an image information processing unit 130, a facial expression processing unit 140, and a reliability evaluating unit 150.

The vocal information processing unit 110 outputs vocal information by detecting a user's emotional change and/or a point of emphasis in the user's voice, based upon vocal information. When the voice is input by a user through a voice input device (not shown), such as a microphone, the vocal information processing unit 110 may detect a change in user emotion including, for example, joy, sadness, anger, fear, disgust, surprise, and the like. The vocal information processing unit 110 may detect or estimate one or more points of emphasis in a user's voice, such as a shout. The vocal information processing unit 110 may output vocal information that may include the result of the detected change in user emotion and/or the detected emphasis in the user's voice.

The pronunciation information processing unit 120 detects changes in mouth shape of the user from pronunciation information of the voice and outputs pronunciation information. When a voice is input by the user through a voice input device such as the microphone, the pronunciation information processing unit 120 observes changes in mouth shape of the user, for example, how far the upper and lower lips are apart, how wide the lips are open, and how far the lips are pushed forward, and outputs the result as pronunciation information.

The image information processing unit 130 detects facial movements and changes in facial expressions of the user and outputs the result of the detection as facial information. For example, when an image is input by the user through an image input device (not shown) such as a camera, the image information processing unit 130 may analyze locations and directions of feature points on a user's face, track the facial movements and changes in facial expressions, and output the result as the facial information.

The estimation of vocal information, the estimation of pronunciation information, and the tracking of the facial movements and changes in facial expressions of the user will be further described below.

The facial expression processing unit 140 represents an avatar facial expression based on at least one of the vocal information received from the vocal information processing unit 110, the pronunciation information from the pronunciation information processing unit 120, and the facial information received from the image information processing unit 130.

For example, the facial expression processing unit 140 may use at least one of the vocal information related to the user's emotional changes and a point of emphasis made by the user, the pronunciation information related to changes in mouth shape of the user, and the facial information related to the user's facial movements and changes in facial expression, to represent the facial expression of a user in a natural and sophisticated avatar in synchronization with the actual facial expressions of the user.

In some embodiments, the avatar facial expression representation apparatus 100 may further include a reliability evaluating unit 150 that evaluates the reliability of the vocal information, the mouth information, and the facial information, wherein the vocal information is output from the vocal information processing unit 110, the pronunciation information is output from the pronunciation information processing unit 120, and the facial information is output from the image information processing unit 130. The vocal information, the pronunciation information, and the facial information are outputted to the reliability evaluating unit 150, before they are outputted to the facial expression processing unit.

Figure 2:
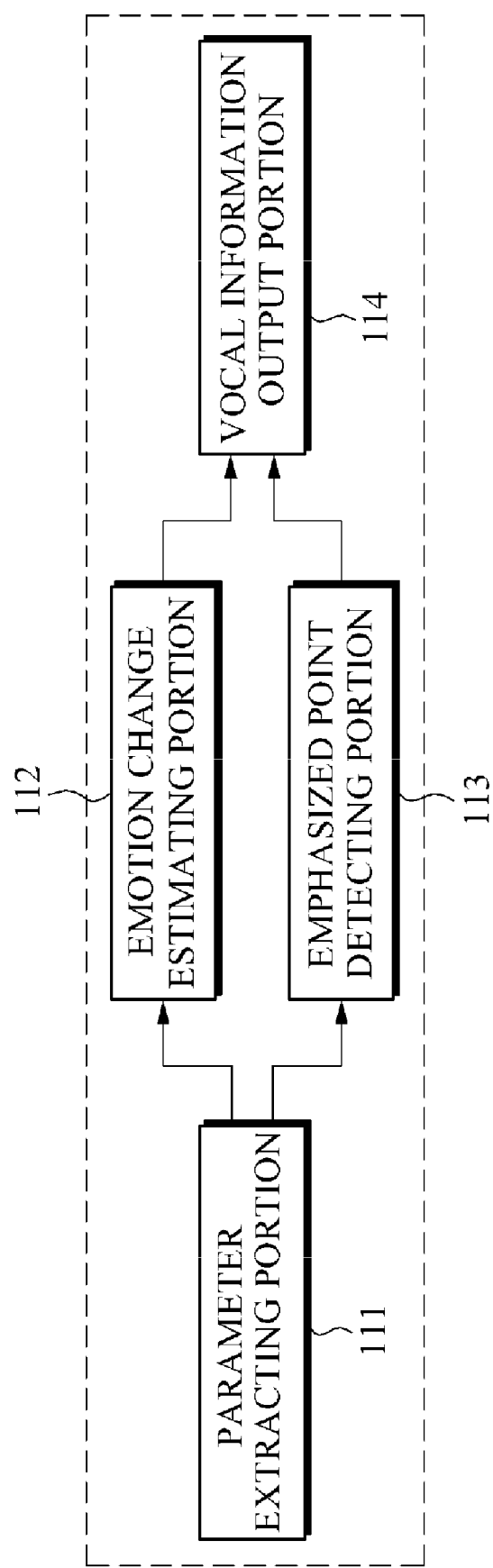
FIG. 2 is a diagram illustrating an exemplary vocal information processing unit of the avatar facial expression representation apparatus illustrated in FIG. 1.

FIG. 2 illustrates an exemplary vocal information processing unit 110 of the avatar facial expression representation apparatus 100 illustrated in FIG. 1. As shown in FIG. 1, the vocal information processing unit 110 includes a parameter extracting portion 111, an emotion change estimating portion 112, a point of emphasis detecting portion 113, and a vocal information output portion 114.

The parameter extracting portion 111 extracts parameters related to changes in emotion from the vocal information of the user's voice. For example, the parameters related to changes in emotion may include the intensity of a voice signal, pitch of the sound, sound quality information, and the like.

The emotion change estimating portion 112 monitors long-term changes in parameters extracted by the parameter extracting portion 111, and estimates changes in emotion. For example, the long-term changes in the parameters may be identified by detecting changes in parameter or a changing speed of parameter during a long-term reference time. To estimate the changes in emotion, for example, an average of the intensity of a voice signal over a period of time, or the average squared change in the intensity of a voice signal over a period of time, may be used. The period of time may be any desired amount of time, for example, 0.1 seconds, 0.5 seconds, 1 second, 2 seconds, or other desired amount of time.

Figure 3:
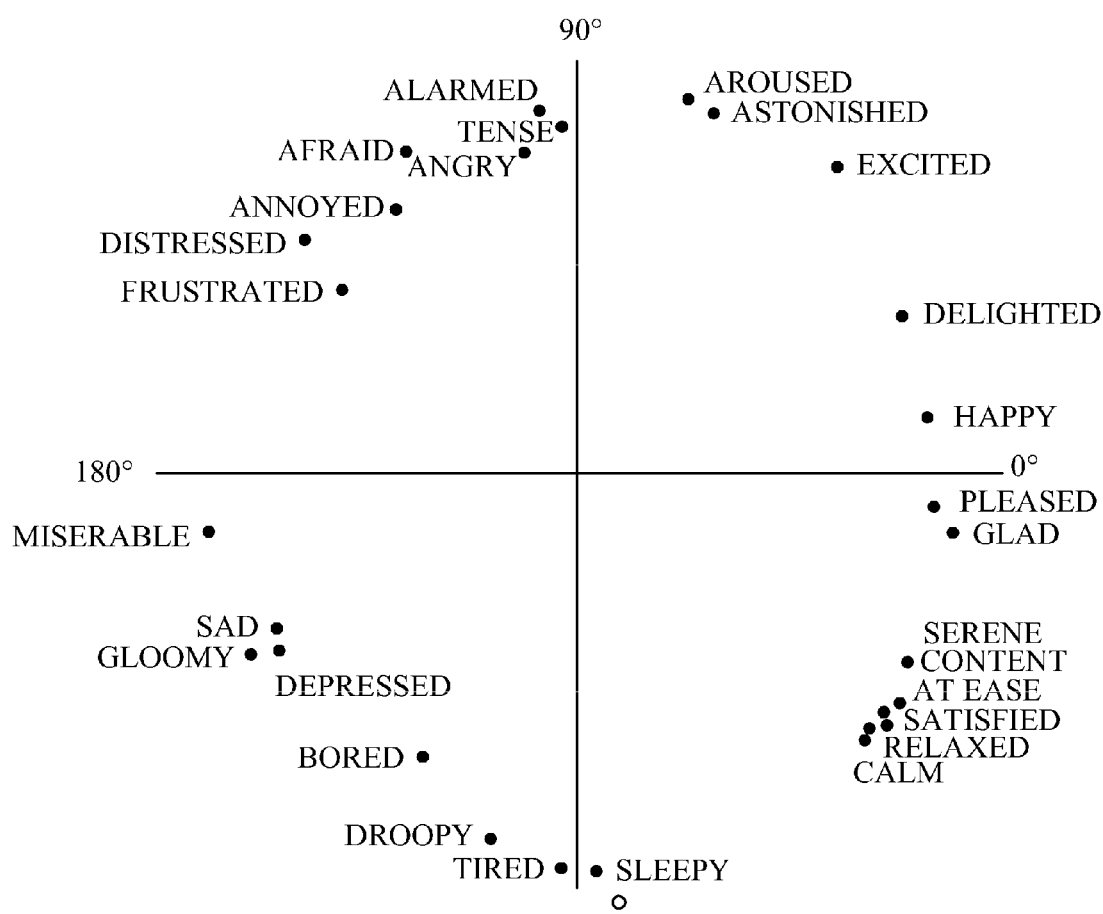
FIG. 3 is an exemplary graph for estimating an emotional state using a circumplex model is of affect.

As shown in FIG. 3, the changes in emotion may be represented using the circumplex model of affect which illustrates emotions in a circular form. The circle is based on parameters of activeness/inactiveness and happiness/unhappiness. In FIG. 3, the horizontal axis denotes satisfaction and the vertical axis denotes activeness.

Changes in emotion may be represented by a mixture of six basic emotions, for example, happiness, sadness, anger, fear, disgust, surprise, and the like, which are defined by MPEG4. Probability distributions of parameters related to the basic emotions may be modeled using a Gaussian mixture, and an emotional state may be estimated by calculating which model is the parameter closest to the related input emotion.

A probability distribution model representing each emotional state and the probability of a parameter related to an input emotion may be calculated. The frequency of each emotional state may be previously recognized, and an emotional state which is the most appropriate to the parameter F (corresponding to the input emotion) may be obtained by the use of Bayes Rule as illustrated below:

$$P(\text{sad} | F) = \frac{P(F | \text{sad})P(\text{sad})}{\sum_{e \in \text{Emotion}} P(F | e)P(e)}$$

The denominator is the sum of the probability values of parameter models related to emotions, and has a value between zero and one. The denominator has a greater value if the facial expression has more correlation with a specific model, and the denominator has a smaller value if the facial expression does not correlate with any models. Such changes in value may be utilized for verifying the reliability of the emotion change estimation information which will be described later.

The point of emphasis detecting portion 113 monitors short-term changes in parameters extracted by the parameter extracting portion 111, to detect one or more points of emphasis. For example, the point of emphasis detecting portion 113 may recognize a voice sound rapidly changed for a short period of time as a point of emphasis. A short-term change in parameter may be obtained by detecting a change of the parameter or a changing speed of the parameter during a short-term reference time that is set shorter than the long-term reference time.

For example, the short-term change in parameter may be obtained by comparing an average of a parameter or average squared change in parameter during the most recent 200 ms, with the corresponding value obtained from the long-term change. If a short-term change in intensity of the voice signal occurs, the point of emphasis detecting portion may regard the change as a user making a sudden loud voice, and if there is a noticeable short-term change in pitch parameter, the point of emphasis detecting portion may regard the change as a user is suddenly making a high-pitched sound.

Loudness and/or pitch of a voice may be increased when a word or a sentence is emphasized. Point of emphasis information may be extracted from such changes in loudness and pitch. Alternatively, a hushed voice such as whisper may be detected by lowering a predetermined reference value that indicates exaggeration.

The vocal information output portion 114 creates the vocal information based on the changes in emotion estimated by the emotion change estimating portion 112 and the vocal emphasis detected by the point of emphasis detecting portion 113, and outputs the created vocal information. The vocal information includes information about the changes in emotion and the point of emphasis of the user's voice. Accordingly, the vocal information processing unit 110 may estimate the change in emotion and vocal emphasis of the user from the vocal information.

Figure 4:
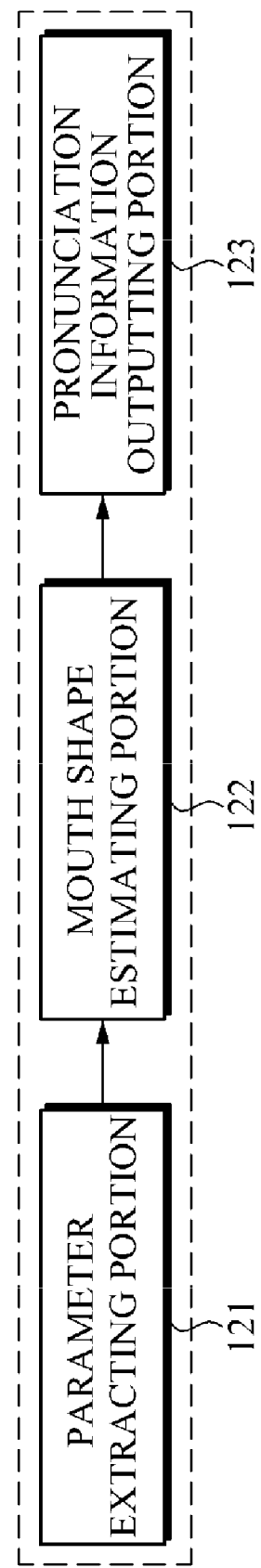
FIG. 4 is a diagram illustrating an exemplary pronunciation information processing unit of the avatar facial expression representation apparatus illustrated in FIG. 1.

FIG. 4 illustrates an exemplary pronunciation information processing unit 120 of the avatar facial expression representation apparatus 100 illustrated in FIG. 1. As shown in FIG. 4, the pronunciation information processing unit 120 includes a parameter extracting portion 121, a mouth shape estimating portion 122, and a pronunciation information outputting portion 123.

The parameter extracting portion 121 extracts parameters related to changes in mouth shape from the vocal information of the voice. For example, the parameters related to changes in mouth shape may include the distance between the upper and lower lips, the width of an opening in the lips, how far forward the lips are pushed, and the like.

For example, linear predictive coding (LPC) parameters that estimate a shape of a space inside a mouth and/or mel-frequency cepstral coefficients (MFCCs) that analyze voice spectrum, may be used to determine parameters related to a change in mouth shape.

The mouth shape estimating portion 122 estimates changes in mouth shape based on the parameter extracted by the parameter extracting portion 121. For example, the mouth shape estimating portion 122 may be configured to search a database to identify which articulation is group the sound of a user's voice belongs to. The database may store articulation groups including similar phonemes that cause similar movements of the lips. The mouth shape estimating portion 122 may extract a parameter corresponding to the found articulation group, and then detect a change in mouth shape of a user based on the extracted parameter.

Figure 6:
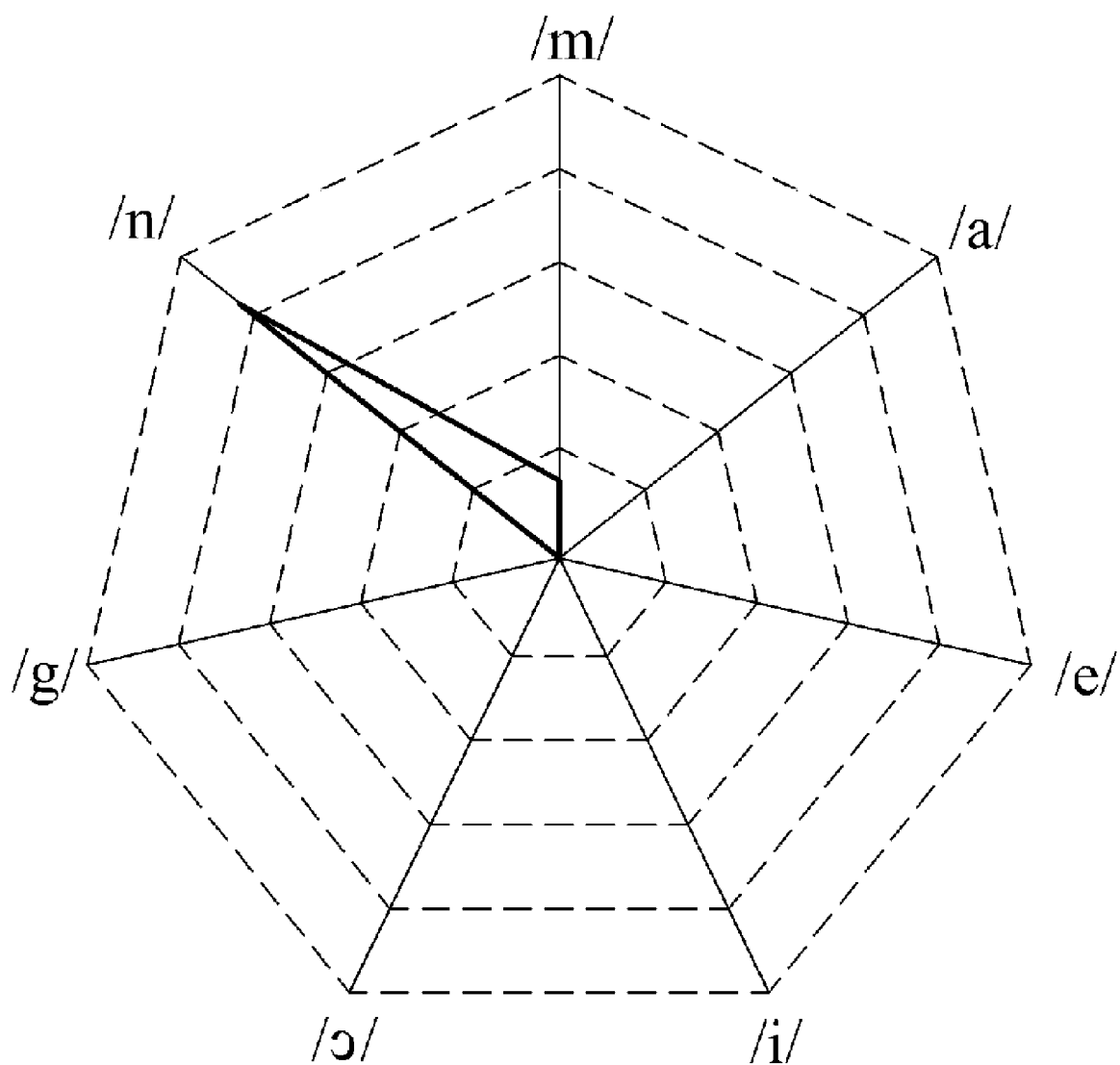
FIG. 6 is a diagram illustrating an exemplary method of determining a mouth shape based on a probability of a sound belonging to each articulation group.

FIG. 5 is a table illustrating exemplary articulation groups, including phonemes that cause similar movements of the lips. Unlike a conventional sound recognition in which a single pronunciation with the highest probability is decided as the pronunciation of a given phoneme, a probability of a sound belonging to each articulation group may be calculated, as shown in FIG. 6. The mouth shape of each articulation group may be determined by averaging with the calculated probability as a weight.

FIG. 6 is a diagram illustrating an exemplary method of determining a mouth shape based on a probability of a sound belonging to each articulation group. FIG. 6 shows an 80% probability that a current pronunciation (represented by thick-lined triangle) will belong to a "/n/" articulation group and a 20% probability that the current sound will belong to a "/m/" articulation group.

The evaluation of reliability of the phoneme recognition may be reflected into an evaluation of reliability of changes in mouth shape which will be described later. For example, the reliability of recognition may be set to low when no sound is input or unclear sound due to noise is input. The reliability of recognition may be set to high when a clear sound is input.

The information output portion 123 creates the pronunciation information based on the changes in mouth shape estimated by the mouth shape estimating portion 122, and outputs the created pronunciation information. The pronunciation information includes a user's mouth shape change information. Accordingly, the pronunciation information processing unit 120 may estimate the user's mouth shape change.

Figure 7:
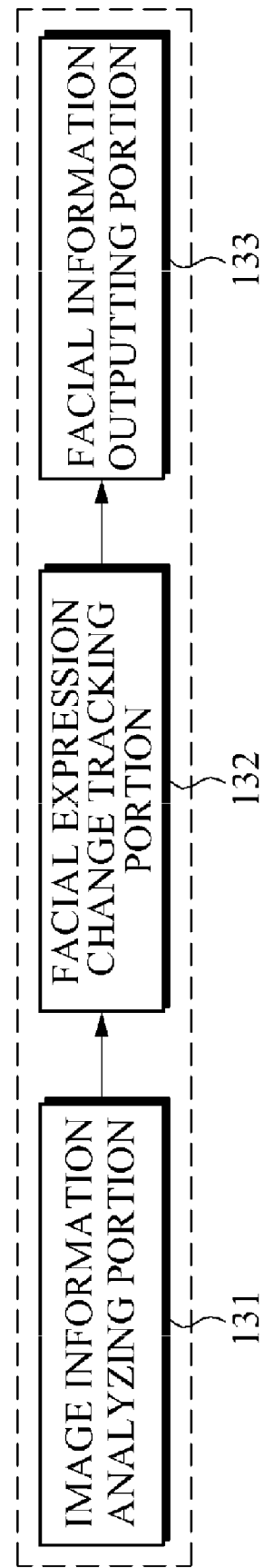
FIG. 7 is a diagram illustrating an exemplary image information processing unit of the avatar facial expression representation apparatus illustrated in FIG. 1.

FIG. 7 illustrates an exemplary image information processing unit 130 of the avatar facial expression representation apparatus 100 illustrated in FIG. 1. As shown in FIG. 7, the image information processing unit 130 includes an image information analyzing portion 131, a facial expression change tracking portion 132, and a facial information output portion 133.

The image information analyzing portion 131 extracts locations of feature points from image information. The feature points show a user's facial expressions. For example, the image information analyzing portion 131 may use a predetermined statistic face model and identify locations on an input face image of the user corresponding to feature points defined on the statistic face model.

Locations of the feature points representing the user's facial expressions may be extracted with an active appearance model or an active shape model.

The face image may be expressed with a limited number of parameters by an equation below.

$$A(u) = A_0(u) + \sum_{i=0}^{l} \lambda_i A_i(u)$$

In this example, u denotes coordinates of points located on a face mesh model, $A_0$ is an average value of face images having locations of the feature points determined, $A_i$ denotes a difference that defines the characteristic of a face image. In the above equation, by changing λ, the face image can vary, reflecting different characteristics of facial expressions.

To acquire a location of a feature point on the face image obtained by the above equation, a parameter is sought which minimizes the following expression.

$$\sum_{u \in s_0} \left[ A_0(u) + \sum_{i=1}^{l} \lambda_i A_i(u) - I(W(u; p; q)) \right]^2$$

In this example, p and q are parameters that represent a face shape, a face rotation, a facial movement, and a change in a face size. I(W(u; p; q)) denotes an image changed from A(u) with given parameters.

The facial expression change tracking portion 132 tracks changes in facial movements and facial expressions based on the locations of the feature points extracted by the image information analyzing portion 131. For example, after finding feature points which show a user's facial expression, the facial expression change tracking portion 132 may track the changes in user's facial movements and facial expressions using the Lucas-Kanade-Tomasi tracker employing an optical flow, a particle filter tracker, and/or a graphical model based tracker.

The facial information output portion 133 creates the facial information based on the changes in user's facial movements and facial expressions tracked by the facial expression change tracking portion 132, and outputs the facial information. The facial information includes information about changes in user's facial movements and facial expressions. Accordingly, the image information processing unit 130 may track the changes in user's facial movements and facial expressions.

Figure 8:
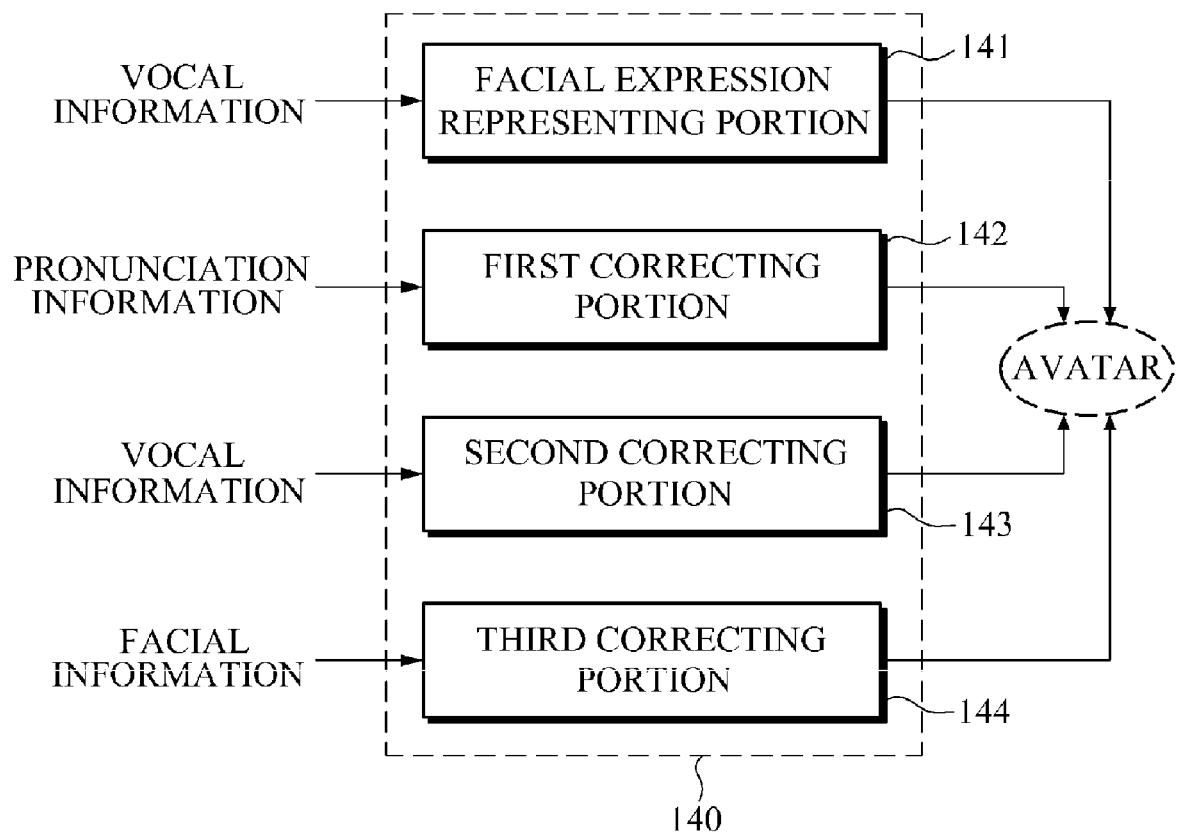
FIG. 8 is a diagram illustrating an exemplary facial expression processing unit of the avatar facial expression representation apparatus illustrated in FIG. 1.

FIG. 8 illustrates an exemplary facial expression processing unit 140 of the avatar facial expression representation apparatus 100 illustrated in FIG. 1. As shown in FIG. 8, the facial expression processing unit 140 includes a facial expression representing portion 141, a first correcting portion 142, a second correcting portion 143, and a third correcting portion 144.

The facial expression representing portion 141 represents a general facial expression of an avatar, according to an emotional change of the user which is included in the vocal information output from the vocal information processing unit 110. For example, the facial expression may be represented by a group of parameters that express movements of the respective feature points on a face.

When emotion information is represented by different facial expression parameters, the same facial expression may appear different on individual models on each of which the emotion information is expressed. On the contrary, when intensities of the basic six emotions are used, facial expression parameters for the respective emotions are previously set, and the facial expression parameters with their own intensities are added together to represent a facial expression that appears similar on the individual models. Such representation can be embodied by the following equation.

$$P_{emotion} = w_{sad}P_{sad}w_{surprise}P_{surprise}w_{anger}P_{anger} + w_{fear}P_{fear} + w_{disgust}P_{disgust}w_{joy}P_{joy}$$

The first correcting portion 142 corrects the avatar facial expression according to changes in a user's mouth shape included in the pronunciation information output from the pronunciation information processing unit 120. The lip movement for the same pronunciation may vary with the emotional state. For example, when the user is excited, the user moves the lips more dynamically, as compared to when the user is bored. In addition, when the user is singing with a loud voice, the movements of user's lips are greater, as compared to when the user is whispering.

The first correction portion 142 corrects the avatar facial expression, which is represented by the facial expression representing portion 141, according to changes in user's mouth shape, so that a natural and sophisticated avatar facial expression may be obtained.

The second correcting portion 143 corrects the avatar facial expression according to the point of emphasis included in the vocal information output from the vocal information processing unit 110. The facial expression may vary with the emphasis of the pronunciation. For example, for emphasizing a particular word, the eyes may be open wide, an eyebrow may be raised, the head may be nodded, the face may turn red, and the like.

The second correcting portion obtains a more natural and sophisticated avatar facial expression because the second correcting portion 143 corrects the facial expressions, which are represented by the facial expression representing portion 141, according to the points of emphasis.

For example, under the assumption that a previous lip shape is "L" and a new estimated lip shape is "L'", a lip shape parameter may be corrected by the following equation.

$$L_{new} = L + w_{emotion} w_{emphasis}(L' - L)$$

In this example, when W is a value close to 1, and when both $W_{emotion}$ and $W_{emphasis}$ become 1, it indicates a corrected lip shape is the same as the estimated lip shape. As the value of w increases, the lip movement becomes more exaggerated, and as the value of w decreases, the lip movement becomes less exaggerated. A value of $W_{emotion}$ for an emotional state and a value of $W_{emphasis}$ for emphasis information, may be set to be different from each other. For example, the value may be set differently when the user feels excited, and the user's lip movements become more dynamically, as compared to when the user feels bored, and also when the user's lip movements become greater when the user is singing a song loudly, as compared to when the user is whispering.

The third correcting portion 144 corrects an avatar's face direction and facial expressions according to the changes in user's facial movement and facial expression included in the facial information output from the image information processing unit 130. The user's facial movements and facial expressions may vary with the locations of the feature points on the user's face.

The face direction and facial expression of the avatar may be corrected as below according to the facial movements and facial expression changes. For example, if the coordinates of the previously tracked feature point are X(k−1) and the coordinates of the currently tracked feature point are X(k), the correlation between these two feature points may be represented by the following function.

$$X(k) = AX(k-1) + b$$

In this function, A is a parameter that represents a change in direction of the head, and b is a parameter that represents a change in location of the head. Values of A and b which minimize a difference between the left side and the right side of the function may be acquired by use of an appropriate method such as least-squared estimation. The location of the head and the change in direction may be estimated, and the correction may be performed according to the estimation result.

Parameters related to facial expressions may be expressed as described below. Information about the location and direction of the head obtained by the above function may be excluded from information of the original location of the feature point, and a location of a feature point in a position that the head is straightened up and faces forward may be obtained and may be used as a reference position for the correcting.

As the distance between the user's face and a camera increases and decreases, the size of the face input through the camera changes, and thus an exaggeration variable, m, may be extracted by comparing a previously estimated size of the face with a current size of the face. A degree of movement of each feature point may be multiplied by the extracted m to regularize a degree of movement of feature points due to the changes in distance between the user and the camera, and it is possible to perform the correction based on the result of regularization.

It is possible to obtain more natural and sophisticated avatar facial expressions because the third correcting portion 144 corrects the facial expressions, which are represented by the facial expression representing portion 141, according to the user's facial movements and facial expression changes.

According to the above operations, actual image information of the user input through the camera and the vocal information and pronunciation information of a voice input through a microphone, may be used to represent avatar facial expressions. The avatar facial expressions may be synchronized with the actual face of the user, and thus a natural and sophisticated avatar facial expressions may be obtained.

In another example, the avatar facial expression representation apparatus 100 may further include a reliability evaluating unit 150. The reliability evaluating unit 150 evaluates the reliability of each of the vocal information, the pronunciation information, and the facial information, wherein the vocal information is output from the vocal information processing unit 110, the pronunciation information is output from the pronunciation information processing unit 120, and the facial information is output from the image information processing unit 130.

The reliability evaluating unit 150 may evaluate the reliability of the vocal information based on correlation between the facial expressions on the emotion model and the facial expressions due to user's emotional change that is included in the vocal information.

The reliability evaluating unit 150 may evaluate the reliability of the pronunciation information based on a length of silence or the quantity of noise included in the voice sound.

The reliability evaluating unit 150 may evaluate the reliability of the facial information based on the locations of the feature points that represent the user's facial expressions and changes in facial expression.

By using the reliability evaluating unit 150, the reliabilities of the actual image information, the vocal information, and the pronunciation information of the user may be evaluated so that a natural and sophisticated avatar facial expression may be represented even when conflicts between different input parameters occur. The conflicts do not take place if the same parameters from the voice and the image for representing the facial expressions are input.

By reflecting the evaluated reliabilities to the representation, a natural and complicated facial expression may be obtained, and will be described later.

In another example, the facial expression processing unit 140 may be configured to discard, when representing the avatar facial expressions, information that has a lower reliability as determined by the reliability evaluating unit 150.

When it is difficult to extract sufficient vocal information or pronunciation information from a voice due to, for example, no voice input or background noise, the reliability of the vocal information and/or the pronunciation information may become significantly low, and thus the vocal information and/or the pronunciation information may be discarded and only the facial information may be used to represent the avatar facial expressions.

For another example, when accurate facial expressions cannot be estimated from image information of the user due to, for example, a poor quality image, or any other obstacles, the reliability of the facial information may be low, and the facial information may be discarded and only the vocal information and pronunciation information may be used to represent the avatar facial expressions.

Operations of controlling avatar facial expressions performed by an avatar facial expression representation apparatus having the above-described configuration will be described with reference to FIG. 9. FIG. 9 is a flowchart illustrating an exemplary method of controlling avatar facial expressions.

A user's voice may be input to an avatar facial expression representation apparatus, for example, through a microphone. The user's voice may be input as an utterance, sentence, phrase, and the like. At 210, the avatar facial expression representation apparatus estimates emotional changes and points of emphasis from vocal information of a user's voice and outputs vocal information based on the result of estimation. When the user's voice is input through a voice input device such as a microphone, changes in emotion such as joy, sadness, anger, fear, disgust, surprise, and the like, may be estimated. Also, a point of emphasis where the voice is exaggerated in tone, volume or rhythm, for example, as when the user is shouting, may be estimated and the result of estimation may be output as the vocal information.

At 220, the avatar facial expression representation apparatus estimates changes in mouth shape of the user from vocal information of a user's voice, and outputs pronunciation information based on the result of the estimation. For example, when the user's voice is input through a voice input device such as a microphone, changes in mouth shape of the user, such as how far the upper and lower lips are apart, how wide the lips are open, how far the lips are pushed forward, and the like, may be estimated and the result of the estimation may be output as the pronunciation information.

At 230, the avatar facial expression representation apparatus tracks facial movements of the user and changes in facial expressions from image information, and outputs facial information based on the result of tracking. When the image of the user is input through an image input device such as a camera, locations and directions of feature points on the user's face may be analyzed from the image of the user, the facial movements and the changes in facial expressions may be tracked, and the result of analysis and tracking may be output as the facial information.

At 240, the avatar facial expression representation apparatus represents facial expressions on the avatar based on at least one of the vocal information output in 210, the pronunciation information output in 220, and the facial information output in 230. The order in which the operations 210, 220, and 230, are performed, may be changed, and the same results may be achieved.

Accordingly, an avatar facial expression is possible to be represented in synchronization with an actual facial expression of a user through the use of at least one of vocal information, pronunciation information, and the image information, so that a natural and sophisticated avatar facial expression of a user may be represented.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An avatar facial expression representation apparatus, comprising:
    a vocal information processor to output vocal information including at least one of an emotional change of a user and a point of emphasis of the user from vocal information generated by the voice of the user;
    a pronunciation information processor to output pronunciation information including a change in mouth shape of the user from pronunciation information generated by the voice of the user;
    an image information processor to output facial information by tracking facial movements and changes in facial expression of the user from image information; and
    a facial expression processor to represent a facial expression of an avatar using at least one of the vocal information output from the vocal information processor, the pronunciation information output from the pronunciation information processor, and the facial information output from the image information processor.

2. The avatar facial expression representation apparatus of claim 1, wherein the vocal information processor comprises:
    a parameter extracting portion to extract a parameter related to a change in emotion from the vocal information of the voice of the user;
    an emotion change estimating portion to estimate a change in emotion by monitoring a long-term change of the parameter extracted by the parameter extracting portion;
    a point of emphasis estimating portion to estimate a point of emphasis by monitoring a short-term change of the parameter extracted by the parameter extracting portion; and
    a vocal information output portion to create the vocal information based on the change in emotion estimated by the emotion change estimating portion and the point of emphasis estimated by the point of emphasis estimating portion, and to output the created vocal information.

3. The avatar facial expression representation apparatus of claim 2, wherein the parameter related to a change in emotion includes an intensity of a voice signal, a pitch of a voice sound, and voice quality information.

4. The avatar facial expression representation apparatus of claim 2, wherein the long-term change of the parameter is identified by detecting a change of the parameter or a changing speed of the parameter during a predetermined first reference time.

5. The avatar facial expression representation apparatus of claim 4, wherein the short-term change of the parameter is identified by detecting a change of the parameter or a changing speed of the parameter during a predetermined second reference time which is set shorter than the predetermined first reference time.

6. The avatar facial expression representation apparatus of claim 5, wherein the point of emphasis estimating portion estimates a point of emphasis as a vocal point where a sound is changed.

7. The avatar facial expression representation apparatus of claim 1, wherein the pronunciation information processor comprises:
    a parameter extracting portion to extract a parameter related to a change in mouth shape from the pronunciation information generated by the voice of the user;
    a mouth shape estimator to estimate a change in mouth shape of the user based on the parameter extracted by a parameter extractor; and
    a pronunciation information output portion to create the pronunciation information based on the change in mouth shape estimated by the mouth shape estimating portion, and to output the created pronunciation information.

8. The avatar facial expression representation apparatus of claim 7, wherein the parameters related to the change in mouth shape include information about at least one of how far the upper and lower lips are apart, how wide the lips are open, and how far the lips are pushed forward.

9. The avatar facial expression representation apparatus of claim 7, wherein the mouth shape estimating portion searches a database for an articulation group to which a sound of the voice of the user belongs to, extracts a parameter corresponding to a found articulation group, and estimates the change in mouth shape of the user based on the extracted parameter, wherein the database stores articulation groups into groups that include phonemes similar in lip shape.

10. The avatar facial expression representation apparatus of claim 1, wherein the image information processor comprises:
   an image data analyzing portion to extract a location of a feature point that represents a facial expression of the user from the image information;
   a facial expression change portion to track facial movements and the changes in facial expression of the user based on the location of a feature point extracted by the image information analyzing portion; and
   a facial information output portion to create the facial information based on the facial movements and changes in facial expressions of the user tracked by the facial expression change tracking portion and to output the created facial information.

11. The avatar facial expression representation apparatus of claim 1, wherein the facial expression processor comprises:
   a facial expression representing portion to represent a general facial expression of an avatar according to changes in emotion included in the vocal information output from the vocal information processor;
   a first correcting portion to correct the facial expression of the avatar according to the change in mouth shape of the user included in the pronunciation information output from the pronunciation information processor;
   a second correcting portion to correct the facial expression of the avatar according to the point of emphasis included in the vocal information output from the vocal information processor; and
   a third correcting portion to correct the facial expression of the avatar according to the facial movements and changes in facial expression of the user included in the facial information output from the image information processor.

12. The avatar facial expression representation apparatus of claim 1, further comprising:
   a reliability evaluator to evaluate a reliability of at least one of the vocal information output from the vocal information processor, a reliability of the pronunciation information output from the pronunciation information processor, and a reliability of the facial information output from the image information processor.

13. The avatar facial expression representation apparatus of claim 12, wherein the facial expression processor discards, when representing the facial expression of the avatar, information which is determined by the reliability evaluator to have a lower reliability.

14. The avatar facial expression representation apparatus of claim 12, wherein the reliability evaluator evaluates the reliability of the vocal information based on correlation between a facial expression due to the change in emotion included in the vocal information and a facial expression according to an emotion model.

15. The avatar facial expression representation apparatus of claim 12, wherein the reliability evaluator evaluates the reliability of the pronunciation information based on a length of silence or the quantity of noise included in a voice sound.

16. The avatar facial expression representation apparatus of claim 12, wherein the reliability evaluator evaluates the reliability of the facial information based on locations of feature points that represent the facial expression of the user and changes in facial expression.

17. The avatar facial expression representation apparatus of claim 1, wherein the point of emphasis is a shout.

18. The avatar facial expression representation apparatus of claim 1, wherein the facial expression processor uses at least one of the vocal information related to emotional changes of the user and the point of emphasis made by the user, the pronunciation information related to changes in mouth shape of the user, and the facial information related to the facial movements of the user and changes in facial expression to represent the facial expression of an avatar in synchronization with the actual facial expressions of the user.

19. The avatar facial expression representation apparatus of claim 1, wherein a probability of a sound belonging to an each articulation group is calculated and a mouth shape of the each articulation group is determined by averaging with the calculated probability as a weight.

* * * * *